United States Patent
Vasekin et al.

(10) Patent No.: US 11,429,393 B2
(45) Date of Patent: Aug. 30, 2022

(54) APPARATUS AND METHOD FOR SUPPORTING OUT-OF-ORDER PROGRAM EXECUTION OF INSTRUCTIONS

(71) Applicant: ARM LIMITED, Cambridge (GB)

(72) Inventors: Vladimir Vasekin, Cambridge (GB); Ian Michael Caulfield, Cambridge (GB); Chiloda Ashan Senarath Pathirane, Cambridge (GB)

(73) Assignee: ARM LIMITED, Cambridge (GB)

( * ) Notice: Subject to any disclaimer, the term of this patent is extended or adjusted under 35 U.S.C. 154(b) by 912 days.

(21) Appl. No.: 14/938,285

(22) Filed: Nov. 11, 2015

(65) Prior Publication Data

US 2017/0132010 A1    May 11, 2017

(51) Int. Cl.
*G06F 9/38*    (2018.01)
(52) U.S. Cl.
CPC ............ *G06F 9/3855* (2013.01); *G06F 9/384* (2013.01)
(58) Field of Classification Search
CPC ....... G06F 9/3836; G06F 9/3855; G06F 9/384
See application file for complete search history.

(56) References Cited

U.S. PATENT DOCUMENTS

| | | | | |
|---|---|---|---|---|
| 5,632,023 A * | 5/1997 | White | ................. | G06F 9/30094 712/215 |
| 2003/0126411 A1* | 7/2003 | Savransky | ............ | G06F 9/3836 712/218 |
| 2004/0255098 A1* | 12/2004 | Ogawa | ................. | G06F 9/3802 712/217 |
| 2014/0089638 A1* | 3/2014 | Mylius | ................. | G06F 9/3017 712/208 |
| 2014/0195780 A1* | 7/2014 | Chaussade | ............ | G06F 9/3867 712/29 |
| 2014/0281415 A1* | 9/2014 | Burgess | ............. | G06F 9/30098 712/217 |
| 2015/0019843 A1* | 1/2015 | Krishna | ................. | G06F 9/384 712/217 |

OTHER PUBLICATIONS

Hennessy, John L.; Patterson, David A. "Computer Architecture: A Quantitative Approach" Third Edition, 2003, pp. 224-235.*
Austin & Brehob, "UMICH R10K", EECS 470 2011, 25 pages.

* cited by examiner

*Primary Examiner* — Jacob Petranek
(74) *Attorney, Agent, or Firm* — Nixon & Vanderhye PC

(57) ABSTRACT

An apparatus for data processing and a method of data processing are provided. Data processing operations are performed in response to instructions which reference architectural registers using physical registers to store data values when performing the data processing operations. Mappings between the architectural registers and the physical registers are stored, and when a data hazard condition is identified with respect to out-of-order program execution of an instruction, an architectural register specified in the instruction is remapped to an available physical register. A reorder buffer stores an entry for each destination architectural register specified by the instruction, entries being stored in program order, and an entry specifies a destination architectural register and an original physical register to which the destination architectural register was mapped before the architectural register remapped to an available physical register.

11 Claims, 7 Drawing Sheets

APPARATUS AND METHOD FOR SUPPORTING OUT-OF-ORDER PROGRAM EXECUTION OF INSTRUCTIONS

TECHNICAL FIELD

The present disclosure relates to data processing. More particularly, it relates to out-of-order program instruction execution.

BACKGROUND

In a data processing apparatus which allows out-of-order execution of program instructions, techniques such as register renaming may be employed to ensure that data hazard conditions do not arise when instructions are executed in a different order to that specified in the program. Moreover, the processor may speculatively execute instructions, for example on the basis of a branch prediction before the branch resolution is known, and further techniques may then be employed to allow the data processing apparatus to recover when such speculative execution is later found to be incorrect, or indeed if an exception condition occurs requiring a similar recovery to be carried out. In order to support such speculative out-of-order execution, a structure may be maintained which allows the processor to retire instructions in program order, which furthermore may be used to maintain an indication of the remapping performed by the register rename capability so that in the event that an exception or a branch misprediction occurs, the processor can "unwind" the speculative execution, returning the processor state to that of the speculation point (i.e. the program instruction when the speculation began). For example a result queue and commit queue may be maintained and a reverse lookup in the result queue allows this rebuild to occur. Other techniques may involve maintaining a FIFO structure per speculatively executed instruction which tracks mappings between architectural registers and physical registers for that instruction. Still further techniques may maintain indications of old and new physical registers to which a particular instruction has been mapped. There remains the potential for improvements to be made in the manner in which such speculative execution of instructions is allowed to take place in an out-of-order fashion.

SUMMARY

Some examples provide an apparatus comprising: processing circuitry to perform data processing operations in response to instructions, wherein the instructions reference architectural registers; register storage circuitry comprising physical registers to store data values for access by the processing circuitry when performing the data processing operations; register rename storage circuitry to store mappings between the architectural registers and the physical registers, and to provide the processing circuitry with a mapping indicating a physical register to use in place of an architectural register specified in an instruction, wherein the register rename circuitry is responsive to identification of a data hazard condition with respect to the architectural register for out-of-order program execution of the instruction to remap the architectural register to an available physical register; and reorder buffer circuitry to store an entry for each destination architectural register specified by the instruction, wherein entries are stored in program order and wherein the entry specifies the destination architectural register and an original physical register to which the destination architectural register was mapped by the register rename storage circuitry before the register rename storage circuitry remapped the architectural register to the available physical register.

Some examples provide a method of data processing comprising: performing data processing operations in processing circuitry in response to instructions, wherein the instructions reference architectural registers; storing data values in physical registers for access by the processing circuitry when performing the data processing operations; storing mappings between the architectural registers and the physical registers; providing the processing circuitry with a mapping indicating a physical register to use in place of an architectural register specified in an instruction; identifying a data hazard condition with respect to the architectural register for out-of-order program execution of the instruction and remapping the architectural register to an available physical register; and storing a reorder buffer entry for each destination architectural register specified by the instruction, wherein entries are stored in program order and wherein the entry specifies the destination architectural register and an original physical register to which the destination architectural register was mapped before being remapped the architectural register to the available physical register.

Some examples provide an apparatus comprising: means for performing data processing operations in processing circuitry in response to instructions, wherein the instructions reference architectural registers; means for storing data values in physical registers for access by the processing circuitry when performing the data processing operations; means for storing mappings between the architectural registers and the physical registers; means for providing the processing circuitry with a mapping indicating a physical register to use in place of an architectural register specified in an instruction; means for identifying a data hazard condition with respect to the architectural register for out-of-order program execution of the instruction and remapping the architectural register to an available physical register; and means for storing a reorder buffer entry for each destination architectural register specified by the instruction, wherein entries are stored in program order and wherein the entry specifies the destination architectural register and an original physical register to which the destination architectural register was mapped before being remapped the architectural register to the available physical register.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

Figure 1:
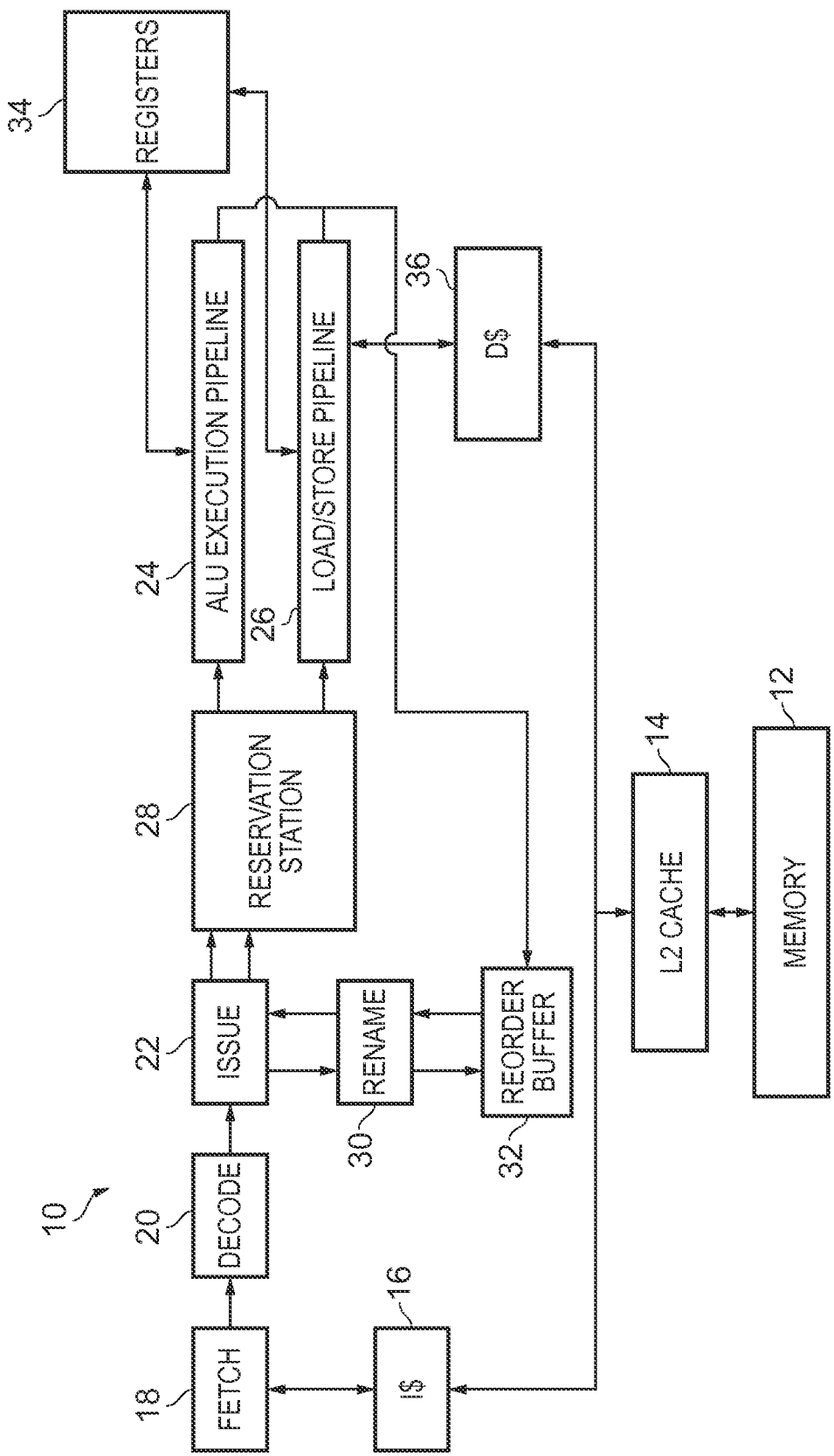
FIG. 1 schematically illustrates a data processing apparatus in one embodiment.

Some examples provide an apparatus comprising: processing circuitry to perform data processing operations in response to instructions, wherein the instructions reference architectural registers; register storage circuitry comprising physical registers to store data values for access by the processing circuitry when performing the data processing operations; register rename storage circuitry to store mappings between the architectural registers and the physical registers, and to provide the processing circuitry with a mapping indicating a physical register to use in place of an architectural register specified in an instruction, wherein the register rename circuitry is responsive to identification of a data hazard condition with respect to the architectural register for out-of-order program execution of the instruction to remap the architectural register to an available physical register; and reorder buffer circuitry to store an entry for each destination architectural register specified by the instruction, wherein entries are stored in program order and wherein the entry specifies the destination architectural register and an original physical register to which the destination architectural register was mapped by the register rename storage circuitry before the register rename storage circuitry remapped the architectural register to the available physical register.

The apparatus is provided with register rename storage circuitry which allows the processing circuitry to execute program instructions in an out-of-order fashion, by mapping the architectural registers specified in the instructions to available physical registers, so that data hazard conditions do not arise as a result of the program execution being out-of-order. Additionally, the apparatus is provided with reorder buffer circuitry which has two key functions. The first of these is to allow in-order program instruction retirement, despite the out-of-order program instruction execution carried out by the processing circuitry. The second key function is to maintain the information necessary for the register rename storage circuitry to be rebuilt in the event that an error occurs during the speculative execution of program instructions, such as an exception or branch misprediction. Thus, where program instruction execution (even out-of-order program instruction execution) has been carried out speculatively by the processing circuitry, for example on the basis of an expectation of a branch resolution before that branch resolution is known, the content of the register rename storage circuitry can be "wound back" to the last "safe" processor state within the apparatus, i.e. in this example the point at which the speculative execution began. The reorder buffer circuitry of the present techniques thus combines all information necessary to manage both normal (in-order) retirement of instructions and rename table rebuild in an out-of-order processor that employs register renaming. Moreover, the present techniques enable the reorder buffer circuitry to be provided in a particularly efficient manner, resulting in an area-efficient and energy-efficient structure, by structuring the entries it holds in terms of the destination architectural registers specified by the instructions. Thus, where an instruction specifies more than one destination architectural register, a corresponding number of more than one separate entries are made in the reorder buffer circuitry. Each entry specifying a destination architectural register also specifies the original physical register to which the destination architectural register was mapped by the register rename circuitry (i.e. before it was remapped by the register rename circuitry). Accordingly, it should be noted that the content of the reorder buffer circuitry is organised by a destination register, rather than for example by instruction. This arrangement of the information is not only particularly efficient in terms of capturing the information required to both allow in-order instruction retirement and register rename storage recovery, but is also allows an efficient mechanism to be provided for performing that recovery. By sequentially applying the destination architectural register/original physical register mappings held in the reorder buffer circuitry to the content of the register rename storage in sequential order (from the exception point back to the speculation point) the content of the register rename storage (i.e. the remap table) can be rewound to the above mentioned "safe" processor state prior to speculative execution.

This approach taken by the present techniques is to be contrasted with more complex techniques applied in out-of-order processors which, in seeking to enable the processor to recover as quickly as possible from an error condition, may provide more complex structures which allow the recovery to be performed in fewer steps, but at the price of that greater structural complexity. For example in a processor which maintains a result queue and a commit queue the rebuilding requires a reverse lookup in the result queue, which adds complexity to the supporting structure which is required. Other approaches may store the required information in terms of an exception structure (i.e. with entries based on potential exceptions), followed by all changes in rename until the next exception, but these have the disadvantage that they cannot also be used to track the completion of instructions (i.e. in-order instruction retirement) and control program counter updates. Moreover the granularity of recovery is limited to such exception points and therefore for example interrupts may be delayed significantly. Other reorder buffer structures using instruction based entries bring complexity by requiring variable sized entries to store both old and new physical register information for as many changes as are made by the ongoing register renaming process and the complexity of the reorder buffer circuitry is therefore notably increased. The present techniques recognise that an advantageous trade-off can be made in providing a small, efficient reorder buffer circuitry, in recognition of the fact that for some out-of-order data processors, the relative infrequency with which such error conditions (e.g. exceptions or branch predictions) occur makes the (potential) expense of recovery time (when multiple updates to the content of the register rename circuitry are needed due to multiple corresponding entries in the reorder buffer) a worthwhile trade-off The reorder buffer circuitry may take a variety of forms, but in some embodiments the reorder buffer circuitry comprises a first-in-first-out storage structure into which at least one new entry is pushed when an instruction is dispatched. This provides a structure for the reorder buffer circuitry which enhances the above mentioned efficiency, in particular for enabling in-order instruction retirement and for enabling an efficient processing of the content of the reorder buffer circuitry when recovery is required, by supporting an arrangement in which at least one entry is pushed at dispatch of a new instruction and popped at its retirement (both stages happening in program order).

In some embodiments the entry in the reorder buffer circuitry comprises a completion flag, wherein the reorder buffer circuitry is responsive to a signal from the processing circuitry which indicates that execution of the instruction is complete to set the completion flag, and the reorder buffer circuitry is responsive to the set completion flag and the entry being the oldest stored entry to remove the entry from the reorder buffer circuitry. This enables the reorder buffer circuitry to manage in-order retirement of the executed instructions, marking instructions as complete with a completion flag and then examining the content of the reorder buffer circuitry from its oldest entry first (i.e. the entry which, in program order, was made first) to then remove the entry from the reorder buffer circuitry if it is marked as complete.

In some embodiments the register rename storage circuitry comprises free physical register storage to store indications of physical registers which are currently available from which the available physical register is selected, and the register rename storage circuitry is responsive to the reorder buffer circuitry removing the entry to add the old physical register to the indications of physical registers which are currently available. Thus, when an entry is removed from the reorder buffer circuitry when the corresponding instruction completes, the recognition that the old physical register specified in that entry will no longer be in use allows that physical register to be returned to the free physical register (pool) storage.

In the light of the fact that for a given instruction more than one entry may be made in the reorder buffer, in some embodiments the entry in the reorder buffer circuitry comprises a tail marker, wherein the tail marker is set when the entry is a last entry for the instruction. This enables the correspondence between entries in the reorder buffer circuitry and individual instructions to be maintained, such that instructions can be handled, in particular retired, atomically.

For example, in some embodiments the reorder buffer circuitry is capable of removing more than one entry atomically, wherein the more than one entry comprises a last entry in which the tail marker is set and at least one entry preceding the last entry for which the tail marker is not set. Thus, when the reorder buffer circuitry finds that the last (oldest) entry has the tail marker set, and is complete, not only is this entry examined to determine instruction retirement, but also any preceding entries for which the tail marker is not set, i.e. meaning that this group of entries belongs to a single instruction. When this group of entries all have the completion marker set, the group, i.e. the instruction, can then be retired and the group of entries can be removed from the reorder buffer.

In some embodiments the reorder buffer circuitry is capable of storing an entry for every instruction processed by the processing circuitry, wherein the reorder buffer circuitry is responsive to no destination architectural register being specified in an instruction to store an entry for which the destination architectural register is specified as a predetermined value which does not indicate an architectural register. The present techniques recognise that although a specific function of the reorder buffer circuitry is to support the rebuilding of the remapping table when of carrying out error recovery, and therefore that where an instruction does not have a destination architectural register there is strictly speaking no need for an entry to be made in the reorder buffer, an advantageously efficient structure for the control of entries being made into the reorder buffer can be provided if no distinction needs to be made between those instructions which do have destination architectural registers specified and those that do not. For example this avoids the need to maintain a field in the completion structure which would indicate the number of associated rename table entries.

In some embodiments the reorder buffer circuitry is responsive to a flag write being specified in an instruction to store an entry for which the flag write target is specified as the destination. Accordingly, the present techniques recognise that an instruction which causes a flag write can also be handled in an analogous manner to an instruction which writes to a destination architectural register. This not only allows recovery for such flag writes to be carried out, but also, in the manner described above with respect to instructions which do not specify a destination architectural register, allows the efficient structure of the reorder buffer to also support flag writes.

The particular manner in which the recovery procedure in the event of an error condition is carried out may take a variety of forms, but in some embodiments the apparatus further comprises register rename recovery circuitry responsive to an error indication from the processing circuitry to perform a recovery procedure comprising removing a youngest entry from the reorder buffer circuitry and updating the mapping in the register rename storage circuitry for the destination architectural register specified in the youngest entry with the original physical register. Thus, the entries in the reorder buffer circuitry may be dealt with in order from the youngest (newest) entry in order to recover from the error condition, applying the original physical register specified in each entry to the remapping table for the corresponding destination architectural register, i.e. for that destination architectural register in the remap table, replacing the specified physical register with the original physical register specified in the entry of the reorder buffer circuitry.

In some embodiments the register rename recovery circuitry is responsive to the error indication to repeat the recovery procedure until all entries have been removed from the reorder buffer circuitry. Thus, by iteratively applying the changes specified in the reorder buffer circuitry to the remapping table, the recovery can be carried out and this may be continued until all entries have been removed from the reorder buffer circuitry, allowing the rewind back to the original speculation point to be carried out.

In some embodiments the apparatus further comprises instruction tagging circuitry to tag the instruction with an index of the entry for the last destination architectural register specified by the instruction, such that the index is available to the processing circuitry when performing the data processing operations for the instruction. This enables the further processing of the instruction, in particular within the processing circuitry (for example embodied as an execution pipeline), to have reference to the relative age (in terms of program order) of the instruction. This index into the reorder buffer circuitry thus corresponds to the last architectural destination register updated by an instruction and since this is unique for the lifetime of the instruction the reorder buffer circuitry then supports a mechanism to uniquely identify (and determine the relative age between) instructions which are currently in-flight. This may for example be of benefit to a memory system where reads and writes to the same address need to be carried out and the relative ordering of the corresponding instructions needs to be respected.

Some examples provide a method of data processing comprising: performing data processing operations in processing circuitry in response to instructions, wherein the instructions reference architectural registers; storing data values in physical registers for access by the processing circuitry when performing the data processing operations; storing mappings between the architectural registers and the physical registers; providing the processing circuitry with a mapping indicating a physical register to use in place of an architectural register specified in an instruction; identifying a data hazard condition with respect to the architectural register for out-of-order program execution of the instruction and remapping the architectural register to an available physical register; and storing a reorder buffer entry for each destination architectural register specified by the instruction, wherein entries are stored in program order and wherein the entry specifies the destination architectural register and an original physical register to which the destination architectural register was mapped before being remapped the architectural register to the available physical register.

Some examples provide an apparatus comprising: means for performing data processing operations in processing circuitry in response to instructions, wherein the instructions reference architectural registers; means for storing data values in physical registers for access by the processing circuitry when performing the data processing operations; means for storing mappings between the architectural registers and the physical registers; means for providing the processing circuitry with a mapping indicating a physical register to use in place of an architectural register specified in an instruction; means for identifying a data hazard condition with respect to the architectural register for out-of-order program execution of the instruction and remapping the architectural register to an available physical register; and means for storing a reorder buffer entry for each destination architectural register specified by the instruction, wherein entries are stored in program order and wherein the entry specifies the destination architectural register and an original physical register to which the destination architectural register was mapped before being remapped the architectural register to the available physical register.

Some particular embodiments will now be described with reference to the figures.

FIG. 1 schematically illustrates a data processing apparatus 10 in one embodiment. Only a high-level view of the apparatus is presented in FIG. 1, to provide context for the components which are of particular relevance to a discussion of the present techniques, and one of ordinary skill in the art will be familiar with the general structure of such a data processing apparatus which performs data processing operations in response to program instructions. Program instructions are stored in the memory 12 and retrieved via level 2 (L2) cache 14 and instruction cache 16 by the fetch circuitry 18. Fetched instructions are passed to the decode circuitry 20 and from there to the issue circuitry (stage) 22. From the issue stage 22 instructions for execution are dispatched to the processing circuitry provided by a number of execution pipelines (of which only two, namely the ALU execution pipeline 24 and the load/store pipeline 26) are shown in FIG. 1, via the reservation station 28. The data processing apparatus 10 is capable of out-of-order program instruction execution and is provided with rename stage (register rename storage circuitry) 30 and the reorder buffer circuitry 32. Instructions which are identified at the issue stage as relating to a potential data hazard condition (in a manner in which one of ordinary skill in the art will be familiar) are flagged to the rename stage 30 for an entry to be updated in a remap table stored therein which indicates a mapping between an architectural register specified in the instruction and a physical register which will be used in place of that architectural register by the execution pipelines when executing this instruction. The rename stage 30 also operates in coordination with the reorder buffer 32 which stores entries relating to the instructions dispatched by the issue stage 22, where these entries are stored in program order, enabling the data processing apparatus to ensure that instructions are retired in program order, despite their execution being allowed to take place out of program order. More detail of the configuration of the register rename storage circuitry 30 and the reorder buffer circuitry 32 will be given with reference to the figures which follow. Instructions dispatched by the issue stage 22 (and where appropriate populating the reservation station 28) are executed by the execution pipelines (24 and 26 in the example of FIG. 1).

In performing their data processing operations in response to the instructions the ALU execution pipeline 24 and the load/store execution pipeline 26 refer to the register storage circuitry 34 which comprises a number of physical registers where data values can be stored. The load/store execution pipeline 26 also accesses memory 12, via the data cache 36 and the L2 cache 14. Once an instruction completes within one of the execution pipeline this fact is indicated to the reorder buffer 32, such that it can mark the corresponding entry or entries in the reorder buffer as complete. Reference to entries within the reorder buffer 32 is made by means of the index of the relevant entry which is used to tag the instruction when it is issued from the issue stage 22. The last architectural destination register updated by an instruction (and hence the corresponding entry in the reorder buffer) is used for this purpose as this is unique for the lifetime of the instruction. This thus enables the reorder buffer 32 to support a means to uniquely identify (and determine the relative age between) instructions which are in flight.

Figure 2:
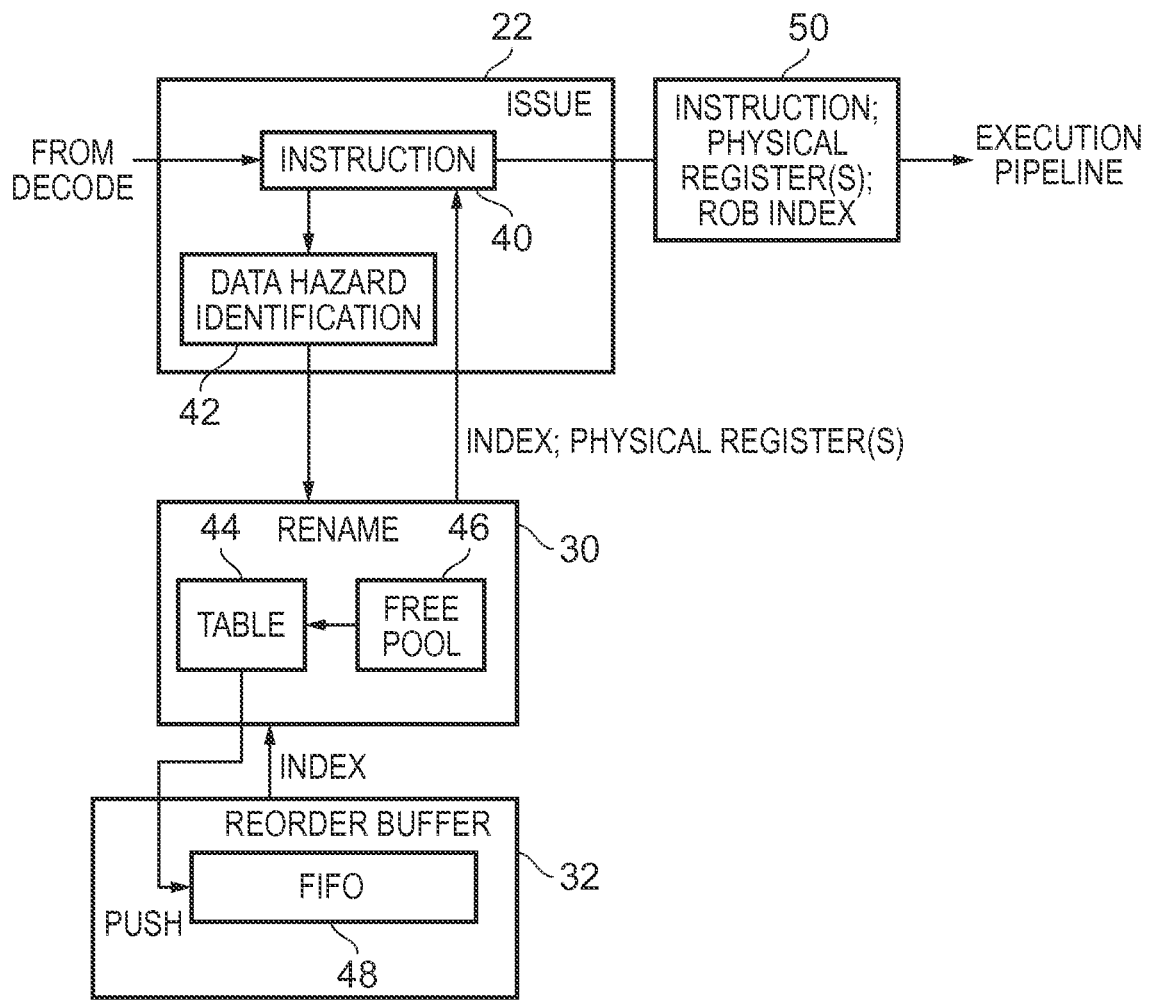
FIG. 2 schematically illustrates the interaction between issue circuitry, rename circuitry and reorder circuitry such as that found in the example of FIG. 1 in one embodiment.

FIG. 2 schematically illustrates in more detail the configuration of the issue circuitry 22, the rename circuitry 30 and the reorder buffer 32 of FIG. 1. An instruction 40 received from the decode stage by the issue circuitry 22 is examined for data hazard possibilities by the data hazard identification circuitry 42 and is further passed to the rename circuitry 30 which maintains a remapping table 44 indicating a translation between architectural registers specified in the instructions being executed and the physical registers which are used for these instructions in their execution. Where a data hazard has been identified for a given instruction by the data hazard identification circuitry 42, the rename circuitry 30 performs a remapping of the physical register which will be used in place of the architectural register specified in the instruction, taking a physical register which is indicated to currently be free from the free register pool 46. For each instruction which is dispatched from the issue stage 22, at least one entry is pushed onto the FIFO 48 within the reorder buffer circuitry 32. The index of the entry pushed onto the FIFO 48, corresponding to the last architectural destination register referenced by the instruction is returned via the rename circuitry 30 to the issue stage 22 and is used to tag the instruction. Thus, as shown in item 50 of FIG. 2, the instruction dispatched from the issue stage to the execution pipeline also comprises an indication of the physical register or registers which will be used when this instruction is executed and this reorder buffer (ROB) index. The ROB index enables the correct entry within the reorder buffer circuitry 42 to later be identified and furthermore provides a means to determine the relative age between instructions which are in flight, since entries in the ROB are made in program order. Where the ordering of two instructions matters, the relevant execution pipeline or memory system component can determine this ordering from their indices.

Figure 3:
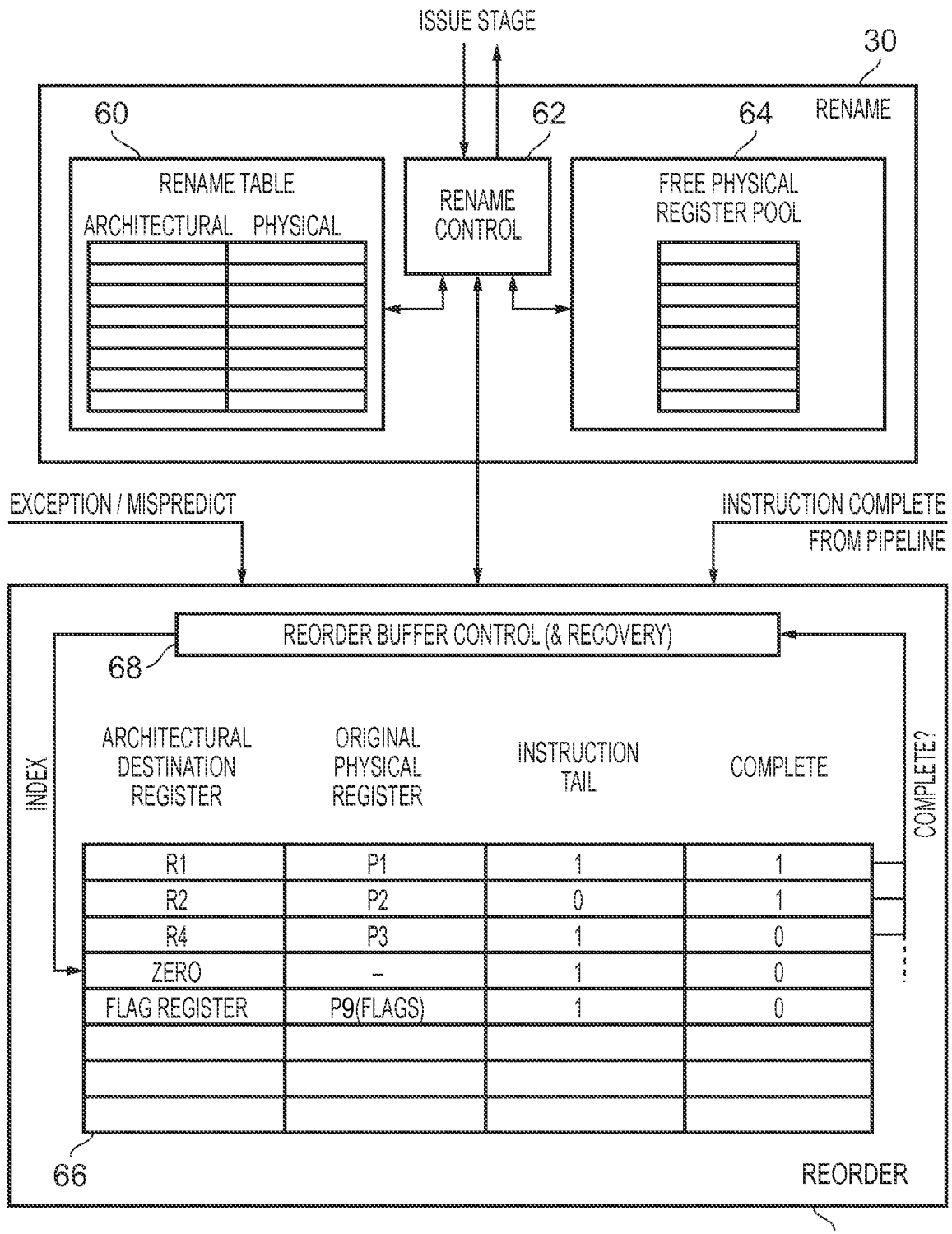
FIG. 3 schematically illustrates in more detail the structure of rename circuitry and reorder circuitry in one embodiment.

FIG. 3 schematically illustrates in further detail the configuration of rename circuitry 30 and reorder buffer circuitry 32 in one embodiment. The rename circuitry 30 comprises a rename table 60, rename control circuitry 62 and a free physical register pool 64. The rename control circuitry 62 maintains overall control of the rename circuitry 30, in particular in the present context administering the use of the rename table 60 and the free physical register pool 64, as well as communicating with the reorder circuitry 32. As is shown in FIG. 3, the rename table 60 comprises a number of entries (which for simplicity of illustration are shown as eight entries in the figure, but the present technique in no way limited to this specific example) in which a correspondence is shown between an architectural register specified in an instruction and a physical register used within the data processing apparatus for the purpose of executing that instruction. Similarly the free physical register pool 64 comprises a number of entries (which also for simplicity of illustration is shown as comprising eight entries in the example of FIG. 3, but the present technique in no way limited to this number) showing those physical registers which are currently available.

The reorder buffer circuitry 32 comprises a FIFO structure 66 which maintains the reorder buffer (ROB) entries and reorder buffer control circuitry 68 (which administers the use of the FIFO 66 and also administers the recovery process when an error condition occurs, as will be described in more detail below). For each instruction dispatched by the issue stage, the reorder buffer control circuitry 68 pushes an entry onto the FIFO 66. Indeed, for an instruction which references more than one architectural destination register (or writes to more than one flag) the reorder buffer control circuitry 68 pushes a corresponding multiple number of entries onto the FIFO 66. Thus, entries in the FIFO 66 are essentially made on the basis of the architectural destination register(s) specified in each instruction dispatched but with the possibility for further entries to be made. For example, it should be noted that an entry is made in the FIFO 66 even if the instruction does not specify an architectural destination register. This simplifies the configuration of the reorder buffer control circuitry 68, since the need for a separate instruction completion tracking structure and register rename tracking structure are not required. Instead, as can be seen in the illustration of FIG. 3, each entry in the ROB FIFO 66 simply comprises an indication of the architectural destination register when one is specified, the zero register in the case of an instruction which does not specify an architectural destination register, and the flag register in the case that the instruction specifies a flag write, together with an indication of the original physical register to which this architectural destination register (or flag register) was mapped by the rename circuitry 30, i.e. before the remapping performed to avoid a data hazard condition. This feature will be explained in more detail with reference to FIG. 4. The entry additionally comprises two further bits which indicate whether the entry corresponds to an instruction tail and whether the instruction is complete. Thus, where only one entry is made in the ROB FIFO 66 for a given instruction, the instruction tail marker is always set. However, where more than one entry is made for a given instruction, only the last entry corresponding to that instruction is marked with the instruction tail marker, whilst any preceding instruction entries corresponding to that instruction are marked as not being an instruction tail. The reorder buffer circuitry 32, and in particular the reorder buffer control circuitry 68, receives an indication from the execution pipeline(s) when an instruction (tagged by its entry in the ROB FIFO 66) is complete and updates the completion markers for the corresponding entries therein accordingly.

Note also that the example entries shown in FIG. 3 also show an entry corresponding to a flag write, namely the last entry in the ROB FIFO 66, where the architectural destination register field is populated by the corresponding flag register and the original physical register field is populated by the corresponding physical register used for this flag.

The reorder buffer control circuitry 68 also continually monitors the content of the FIFO 66, and when the oldest entry is the FIFO is marked as complete, and if any immediately preceding non-tail entries are also marked as complete, then the reorder buffer control causes these entries to be popped from the FIFO since this instruction can now be retired. Thus, multiple entries corresponding to a given instruction are removed atomically from the FIFO, ensuring that instructions are retired on a per instruction basis. The reorder buffer control circuitry 68, as mentioned above, also administers the role that the reorder buffer circuitry 32 plays in a recovery process when an error condition occurs within the data processing apparatus, for example when an exception occurs or when a branch misprediction is identified. This indication of the error condition is received by the reorder buffer control circuitry 68 and in response the reorder buffer control circuitry communicates with the rename control circuitry 62 in order to wind back the content of the rename table 60 to the point at which speculative instruction execution began, so that the processor state can be returned to the last known "safe" status. Together the reorder buffer control circuitry 68 and rename control circuitry 62 thus act in this situation as register rename recovery circuitry. More detail of this recovery process is given below with reference to the following figures.

Figure 4:
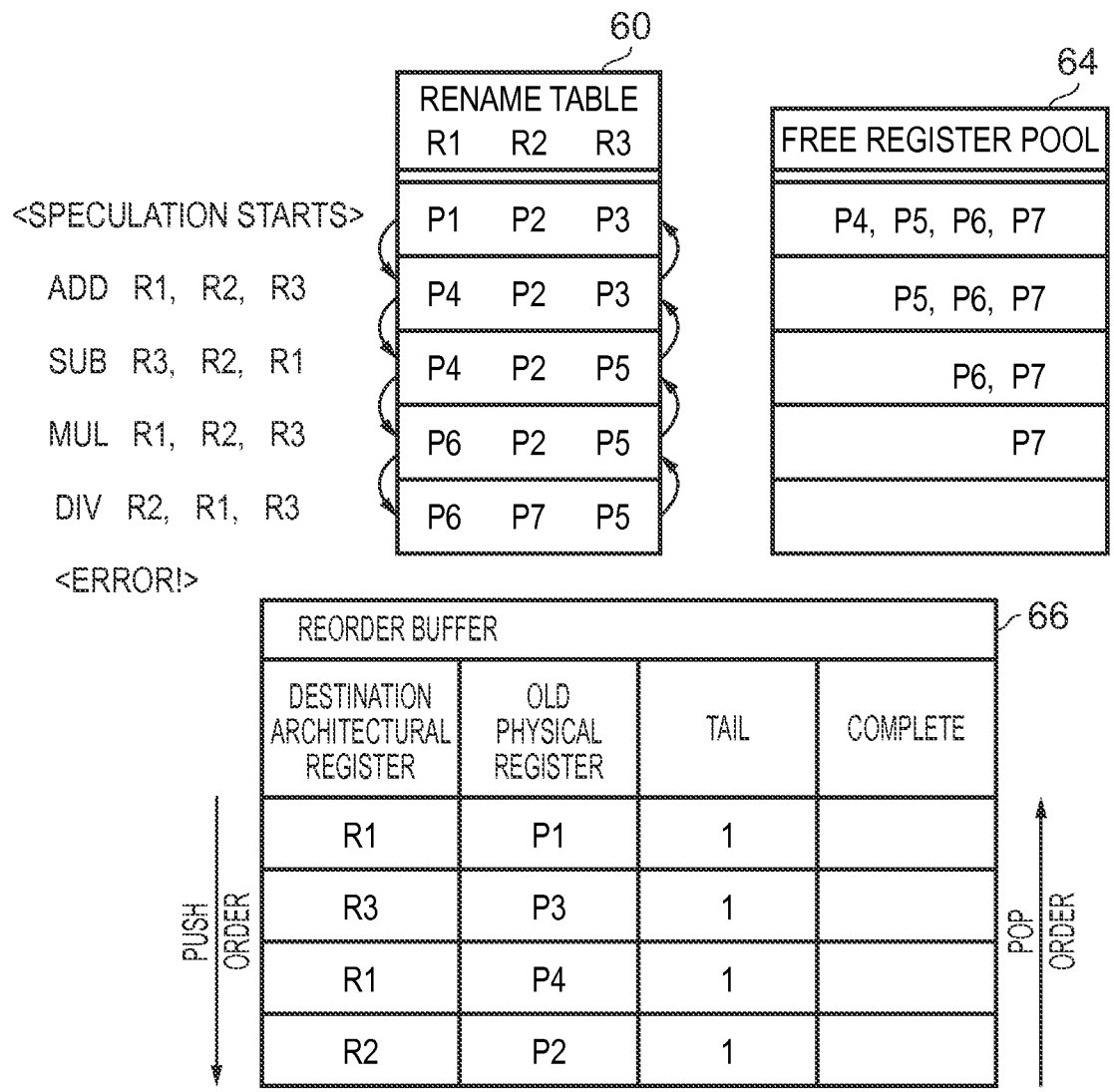
FIG. 4 shows the evolution of the content of a rename table, free register pool and reorder buffer in one embodiment as speculative program execution takes place prior to an error occurring, and the subsequent updates which are made as part of a recovery process.

FIG. 4 shows the evolution of the content of a rename table 60, a free register pool 64 and a reorder buffer 66 in one example. On the left of FIG. 4 a sequence of program instructions is shown, as well as the fact that immediately preceding the first instruction speculative execution started (for example on the basis of a branch prediction) and after the fourth instruction shown an error condition occurs, in this example this being an indication that the branch prediction was in fact incorrect. The rename table 60 maintains a correspondence between the instruction-specified architectural registers (Rn) and the physical registers (Pn) currently being used in the data processing apparatus. At the point at which the speculative execution starts the mapping between architectural registers and physical registers is R1=P1, R2=P2 and R3=P3. At this point it can also be seen that the processor currently has physical registers P4-P7 available as shown in the corresponding line of the free register pool 64. For each of the four instructions shown in the example sequence on the left of FIG. 4, the corresponding updates to the rename table 60 and the free register pool 64 are shown, as well as the entries which are made in the reorder buffer 66. Thus, for example when the ADD instruction is encountered, and a data hazard condition is identified with respect to the destination architectural register R1, the rename circuitry causes the rename table 60 to be updated such that physical register P4 (selected with reference to the free register pool 64) is then used for the execution of this instruction within the execution pipelines. The mapping then held within the rename table 60 is R1=P4, R2=P2 and R3=P3. Correspondingly, a first entry has been pushed onto the reorder buffer FIFO 66, indicating the correspondence between the destination architectural register R1 and the old physical register P1 before this destination architectural register was remapped by the rename table 60 at this iteration. The entry in the reorder buffer is also marked as tail entry, since there is only one entry for this instruction.

This process continues for the SUB, the MUL, and the DIV instructions, with free registers being taken from the free register pool 64 in order to remap these destination architectural registers in the rename table 60. Thus, by the end of this process the reorder buffer 66 has had four entries (one per instruction) pushed onto it, each indicating the corresponding destination architectural register and old physical register, each entry being marked as a tail instruction. When the error condition (the branch misprediction indication) is received by the reorder buffer circuitry, the entries in the ROB FIFO 66 are then popped in the reverse order to that in which they were pushed on the FIFO, and for each entry popped, the rename table 60 is updated (or rather, rewound) to replace the mapping indicated therein. This also repopulates the free register pool 64 with the correspondingly released physical registers. This thus enables the reorder buffer 66 and rename table 60 to be returned to the correct status at which the speculative execution started, namely where R1=P1, R2=P2, and R3=P3.

Figure 5:
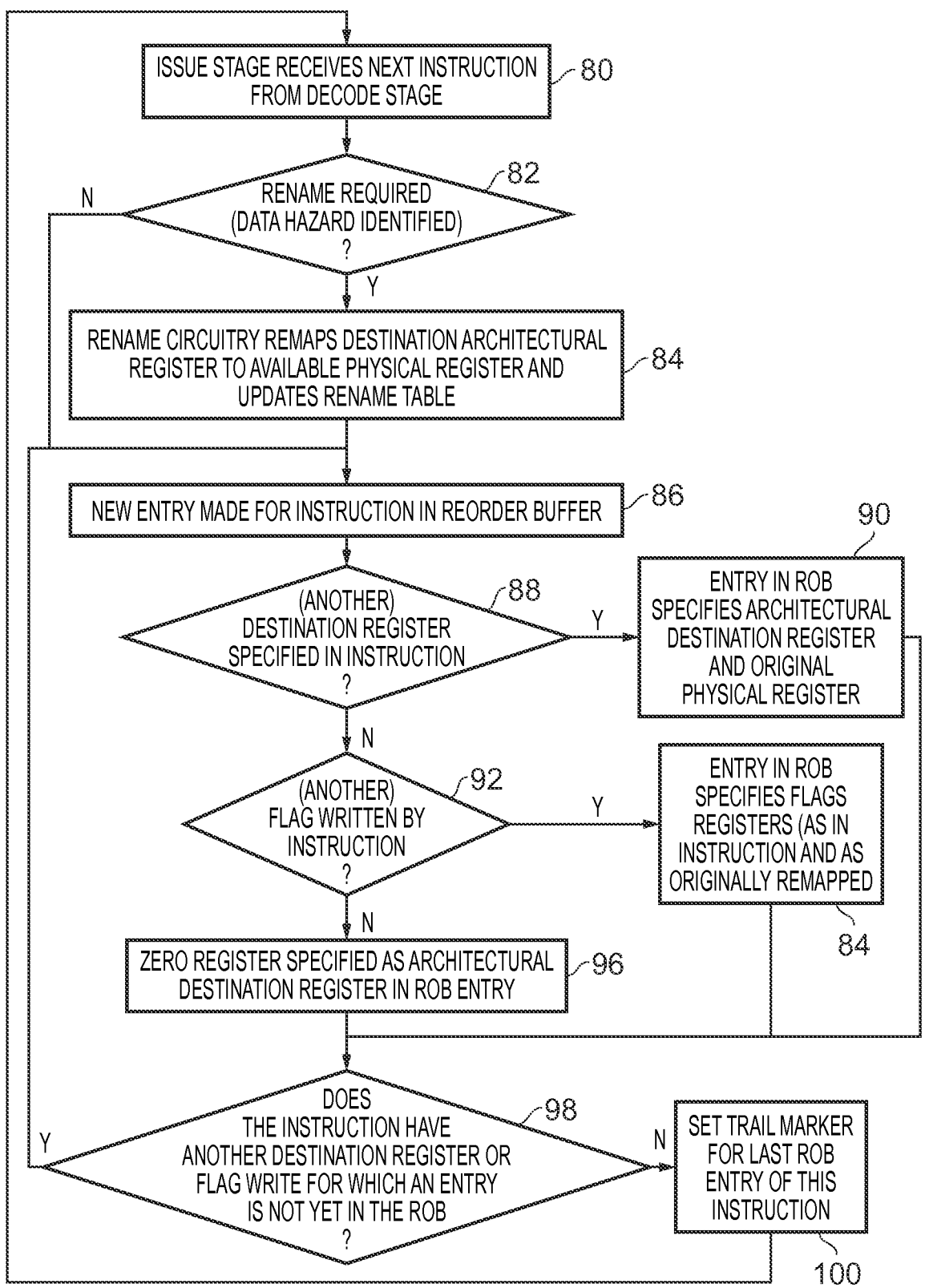
FIG. 5 shows a sequence of steps by which entries are made in a rename table and reorder buffer in one embodiment.

FIG. 5 is a flow diagram indicating a sequence of steps which are carried out in the method of one embodiment, to populate entries in the rename table and the reorder buffer. The flow can be considered to begin at step 80, where the issue stage receives the next instruction from the decode stage. It is identified at step 82 if a rename is required, i.e. if a data hazard has been identified for the out-of-order execution of this instruction. If such a data hazard is identified then the rename circuitry remaps the destination architectural register to an available physical register and updates the rename table accordingly at step 84. If no data hazard is identified at step 82 then the flow proceeds directly to step 86. At step 86 a new entry is made for the instruction in the reorder buffer and a step 88 it is determined if a destination register is specified in this instruction. Note that steps 88 and 92 in FIG. 4 refer to destination register or "another" destination register and flag written or "another" flag written, since multiple iterations around the flow passing through these steps is possible, as will be apparent from the discussion below. If at step 88 it is determined that a data register is specified in the instruction then the flow proceeds to step 90, and the entry in the ROB specifies the architectural destination register and the original physical register. The flow then proceeds to directly to step 98. If however at step 88 there is not (another) destination register specified in the instruction then at step 92 it is determined if there is (another) flag written by the instruction. Where this is the case the flow proceeds via step 94 where the entry in the ROB is used to specify the flag register used for the implementation of this flag write, in the form originally held in the instruction and as remapped by the rename table. The flow then proceeds to step 98. If at step 92 there is not a flag written by the instruction either, then at step 96, since this means that neither a destination register nor a flag write is specified in the instruction, the zero register is specified as the architectural destination register in this ROB entry. Then at step 98 it is determined if the instruction has another destination register or flag write for which an entry has not been made in the ROB. This being the case, the flow returns to step 86 for a new entry to be made for this instruction in the reorder buffer and steps 88-96 continue iteratively as described above. Finally, once it is determined at step 98 that there is not a further destination register or a flag write for this instruction, at step 100 the tail marker is set for the last ROB entry of this instruction and the flow then returns to step 80.

Figure 6:
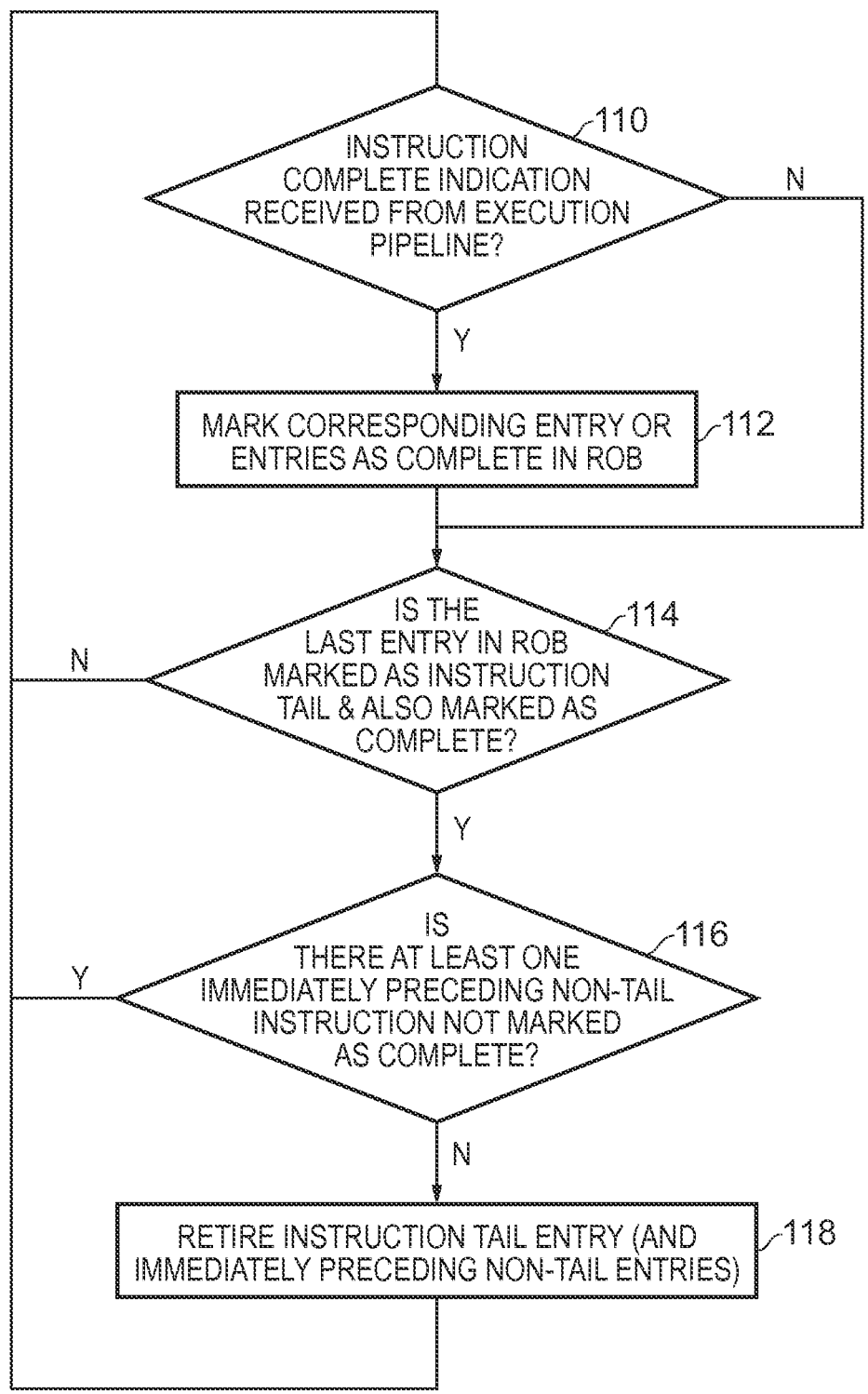
FIG. 6 shows a sequence of steps which illustrate how entries in a reorder buffer are retired in one embodiment.

FIG. 6 shows a sequence of steps which are taken in one example method, according to which the ROB entries are updated on the basis of instruction completion indications received from the execution pipeline. The flow can be considered to begin at step 110 where it is determined if an instruction completion indication has been received from the execution pipeline. If it has then the flow proceeds via step 112, where the corresponding entry or entries are marked as complete in the ROB. If however no such instruction completion indication is received, the flow proceeds directly to step 114. At step 114, the reorder buffer circuitry determines if the last (oldest) entry in the ROB is marked as an instruction tail, and is also marked as complete. If this is not the case then the flow returns to step 110. However, if this is the case then the flow proceeds to step 116, where the reorder buffer circuitry determines if there is at least one immediately preceding non-tail instruction which is not marked as complete, i.e. if any further entries made for this same instruction (and thus being non-tail entries) are not marked as complete. This being the case the flow returns to step 110. However, if a set of entries in the ROB, comprising an oldest tail entry and any immediately preceding non-tail entries, is entirely marked as complete then this entry or entries are then removed from the ROB and the instruction is retired. The flow returns to step 110.

Figure 7:
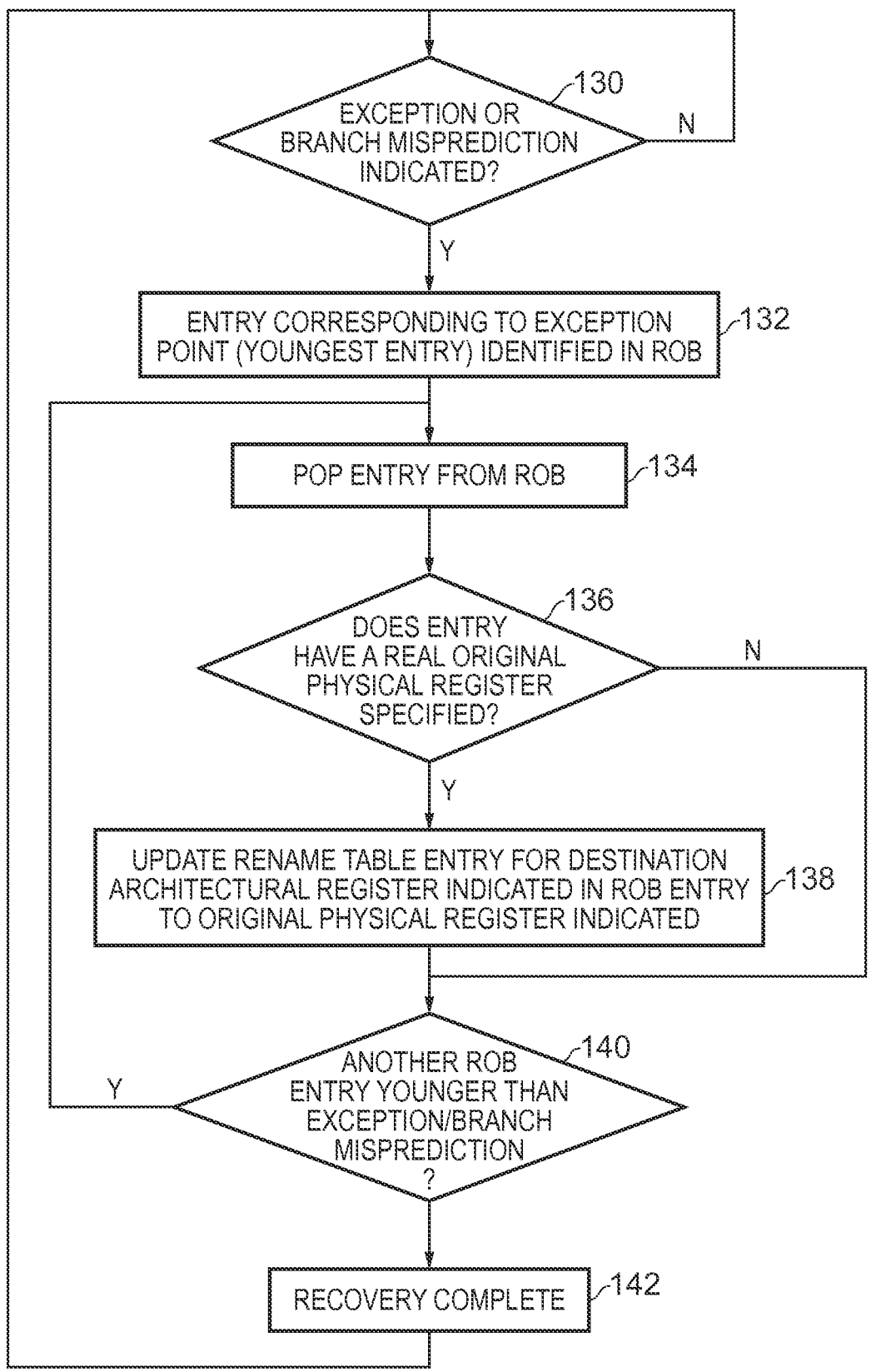
FIG. 7 shows a sequence of steps which are taken in one embodiment when an exception or branch misprediction is encountered following speculative instruction execution in one embodiment.

FIG. 7 shows a sequence of steps shown in one example method according to which the apparatus responds to an error condition to rewind the content of the remapping table. The flow can be considered to begin at step 130, where it is determined if an exception or branch misprediction (error condition) has been indicated. If it is not then the flow waits at this step until such an error condition occurs. When it does the flow proceeds to step 132 where the entry corresponding to the exception point (the youngest entry) is identified in the ROB and at step 134 this entry is popped from the ROB. At step 136 it is determined if this entry has a real original physical register specified (i.e. if it is not an entry with a "zero" architectural destination register specified) and this being the case the flow proceeds to step 138, where the rename table entry for the destination architectural register indicated in this ROB entry is updated to indicate the original physical register specified by this ROB entry. For an entry in the ROB which does not have a real original physical register specified the flow proceeds directly to step 140. At step 140 it is determined if there is another ROB entry which is younger than the exception/branch misprediction point and if this is the case then the flow returns to step 134, this entry is popped from the ROB and so on as described above. Once all entries corresponding to the instructions executed since the speculation point have been popped from the ROB and any necessary update to the rename table has been made then at step 142 the recovery process is complete and the flow returns to step 130.

In brief overall summary an apparatus for data processing and a method of data processing are provided. Data processing operations are performed in response to instructions which reference architectural registers using physical registers to store data values when performing the data processing operations. Mappings between the architectural registers and the physical registers are stored, and when a data hazard condition is identified with respect to out-of-order program execution of an instruction, an architectural register specified in the instruction is remapped to an available physical register. A reorder buffer stores an entry for each destination architectural register specified by the instruction, entries being stored in program order, and an entry specifies a destination architectural register and an original physical register to which the destination architectural register was mapped before the architectural register remapped to an available physical register.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
   processing circuitry to perform data processing operations in response to instructions, wherein the instructions reference architectural registers;
   register storage circuitry comprising physical registers to store data values for access by the processing circuitry when performing the data processing operations;
   register rename storage circuitry to store mappings between the architectural registers and the physical registers, and to provide the processing circuitry with a mapping indicating a physical register to use in place of an architectural register specified in an instruction, wherein the register rename circuitry is responsive to identification of a data hazard condition with respect to the architectural register for out-of-order program execution of the instruction to remap the architectural register to an available physical register;
   reorder buffer circuitry to store an entry for each destination architectural register specified by the instruction, wherein entries are stored in program order and wherein the entry specifies the destination architectural register and an original physical register to which the destination architectural register was mapped by the register rename storage circuitry before the register rename storage circuitry remapped the architectural register to the available physical register; wherein
   the reorder buffer circuitry is capable of storing an entry for every instruction processed by the processing circuitry, wherein the reorder buffer circuitry is responsive to no destination architectural register being specified in an instruction to store an entry for which the destination architectural register is specified as a predetermined value which does not indicate an architectural register; and
   register rename recovery circuitry responsive to an error indication from the processing circuitry to perform a recovery procedure comprising removing a youngest entry from the reorder buffer circuitry and updating the mapping in the register rename storage circuitry for the destination architectural register specified in the youngest entry with the original physical register; wherein
   the register rename recovery circuitry is responsive to an entry comprising the predetermined value to remove the entry from the reorder buffer without updating the mapping in the register rename storage circuitry.

2. The apparatus as claimed in claim 1, wherein the reorder buffer circuitry comprises a first-in-first-out storage structure into which at least one new entry is pushed when an instruction is dispatched.

3. The apparatus as claimed in claim 1, wherein the entry in the reorder buffer circuitry comprises a completion flag, wherein the reorder buffer circuitry is responsive to a signal from the processing circuitry which indicates that execution of the instruction is complete to set the completion flag, and the reorder buffer circuitry is responsive to the set completion flag and the entry being the oldest stored entry to remove the entry from the reorder buffer circuitry.

4. The apparatus as claimed in claim 3, wherein the register rename storage circuitry comprises free physical register storage to store indications of physical registers which are currently available from which the available physical register is selected, and the register rename storage circuitry is responsive to the reorder buffer circuitry removing the entry to add the old physical register to the indications of physical registers which are currently available.

5. The apparatus as claimed in claim 1, wherein the entry in the reorder buffer circuitry comprises a tail marker, wherein the tail marker is set when the entry is a last entry for the instruction.

6. The apparatus as claimed in claim 5, wherein the reorder buffer circuitry is capable of removing more than one entry atomically, wherein the more than one entry comprises a last entry in which the tail marker is set and at least one entry preceding the last entry for which the tail marker is not set.

7. The apparatus as claimed in claim 1, wherein the reorder buffer circuitry is responsive to a flag write being specified in an instruction to store an entry for which the flag write target is specified as the destination.

8. The apparatus as claimed in claim 1, wherein the register rename recovery circuitry is responsive to the error indication to repeat the recovery procedure until all entries have been removed from the reorder buffer circuitry.

9. The apparatus as claimed in claim 1, further comprising instruction tagging circuitry to tag the instruction with an index of the entry for the last destination architectural register specified by the instruction, such that the index is available to the processing circuitry when performing the data processing operations for the instruction.

10. A method of data processing comprising:
    performing data processing operations in processing circuitry in response to instructions, wherein the instructions reference architectural registers;
    storing data values in physical registers for access by the processing circuitry when performing the data processing operations;
    storing mappings between the architectural registers and the physical registers;
    providing the processing circuitry with a mapping indicating a physical register to use in place of an architectural register specified in an instruction;
    identifying a data hazard condition with respect to the architectural register for out-of-order program execution of the instruction and remapping the architectural register to an available physical register;
    storing a reorder buffer entry for every instruction processed by the processing circuitry and for each destination architectural register specified by the instruction, wherein entries are stored in program order and wherein the entry specifies the destination architectural register and an original physical register to which the destination architectural register was mapped before being remapped the architectural register to the available physical register;

responsive to no destination architectural register being specified in an instruction, storing an entry for which the destination architectural register is specified as a predetermined value which does not indicate an architectural register;

responsive to an error indication from the processing circuitry, performing a recovery procedure comprising removing a youngest entry from the reorder buffer and updating the mapping for the destination architectural register specified in the youngest entry with the original physical register; and responsive to an entry comprising the predetermined value, removing the entry from the reorder buffer without updating the mapping.

11. An apparatus comprising:

means for performing data processing operations in processing circuitry in response to instructions, wherein the instructions reference architectural registers;

means for storing data values in physical registers for access by the processing circuitry when performing the data processing operations;

means for storing mappings between the architectural registers and the physical registers;

means for providing the processing circuitry with a mapping indicating a physical register to use in place of an architectural register specified in an instruction;

means for identifying a data hazard condition with respect to the architectural register for out-of-order program execution of the instruction and remapping the architectural register to an available physical register;

means for storing a reorder buffer entry for each destination architectural register specified by the instruction, wherein entries are stored in program order and wherein the entry specifies the destination architectural register and an original physical register to which the destination architectural register was mapped before being remapped the architectural register to the available physical register; wherein the means for storing a reorder buffer entry is capable of storing an entry for every instruction processed by the processing circuitry, wherein the means for storing a reorder buffer entry is responsive to no destination architectural register being specified in an instruction to store an entry for which the destination architectural register is specified as a predetermined value which does not indicate an architectural register; and means for performing a recovery procedure responsive to an error indication from the processing circuitry, the recovery procedure comprising removing a youngest entry from the reorder buffer and updating the mapping for the destination architectural register specified in the youngest entry with the original physical register, wherein the means for performing a recovery procedure is responsive to an entry comprising the predetermined value to remove the entry from the reorder buffer without updating the mapping.

* * * * *